United States Patent [19]
Johnston et al.

[11] Patent Number: 5,103,923
[45] Date of Patent: Apr. 14, 1992

[54] METHOD AND APPARATUS FOR PROPELLING AND RETARDING OFF-ROAD HAULERS

[75] Inventors: Ronald A. Johnston; Dwight Baker; Gary L. Nelson, all of Longview, Tex.

[73] Assignee: Marathon LeTourneau Company, Longview, Tex.

[21] Appl. No.: 443,177

[22] Filed: Nov. 30, 1989

[51] Int. Cl.⁵ .............................................. B60K 6/00
[52] U.S. Cl. ................................ 180/65.2; 180/65.4; 191/4; 290/14; 318/148
[58] Field of Search .............. 180/65.2, 65.3, 65.4, 180/65.5, 65.8, 2.1; 191/4, 5; 290/14, 15, 17; 318/148

[56] References Cited

U.S. PATENT DOCUMENTS

| | | | |
|---|---|---|---|
| 3,637,956 | 1/1972 | Blackman | 180/2.1 X |
| 3,699,351 | 10/1972 | Addie | 290/17 X |
| 4,099,589 | 7/1978 | Williams | 180/65.2 |
| 4,113,045 | 9/1978 | Downing, Jr. | 180/6.48 X |
| 4,119,861 | 10/1978 | Gocho | 180/65.4 X |
| 4,199,037 | 4/1980 | White | 180/65.4 X |
| 4,306,156 | 12/1981 | Monaco et al. | 180/65.2 X |

FOREIGN PATENT DOCUMENTS 0139005 10/1981 Japan .................................. 180/65.8

OTHER PUBLICATIONS

Lake, et al., "Truck Haulage Using Overhead Electrical Power to Conserve Diesel Fuel and Improve Haulage Economics", *Presented at the 110th AIME Annual Meeting*, Chicago, Illinois, (Feb. 22-26, 1981), pp. 1-19.
Wulfert, "Electric Trolly Assist", *WABCO-Construction and Mining Equipment*, Peoria, Illinois (Feb. 1981), pp. A-1 thru J-1.

Primary Examiner—Andres Kashnikow
Assistant Examiner—Brian L. Johnson
Attorney, Agent, or Firm—Vinson & Elkins

[57] ABSTRACT

An improved method and apparatus for powering and controlling the operation of large diesel-electric off-road haulers of the type in which hauler drive wheels are propelled and retarded by DC electric wheel motors powered from on-board generators, optionally supplemented by DC power, from external trolley lines. In the disclosed system, thyristor-type converters connected into the system AC power grid are used to receive supplemental external power from DC trolley lines and supply it into the AC power distribution grid in the propel mode. The use of such thyristor-type converters makes possible the use of supplement trolley line power without provision of separate switching or control gear to operate the DC wheel motors when trolley line power is received. Thyristor-type converters also may be used to supply current generated by wheel motors in the retarding mode to retarding resistors, making possible the use of the initial electrical power generated by the wheel motors to replace load requirements of the diesel engine, resulting in substantial fuel savings.

29 Claims, 3 Drawing Sheets

METHOD AND APPARATUS FOR PROPELLING AND RETARDING OFF-ROAD HAULERS

BACKGROUND AND SUMMARY

The present invention relates to a method and apparatus for propelling and retarding diesel electric haulers. Such haulers include very large off-road dump trucks, typically having a load carrying capacity of 100 to 200 tons or more. They are used most often in open pit mining operations and other applications where very large amounts of earth, rock, etc., must be moved.

Many such haulers currently utilize a diesel/electric drive as their power source to propel the vehicle. Such systems typically are comprised of a prime mover (diesel) driven electric generator whose prime output is used for supplying electric power to high horse power DC electric motors connected through a gear reduction to a set of drive wheels on each side of the vehicle. Typically, the electric power is generated as alternating current ("AC") and converted into direct current ("DC") for use by DC wheel motors. Many control schemes have been designed to regulate the power and speed of these motors to provide adequate power output to propel the haulers. Since DC wheel motors require variable voltage from zero to a maximum as vehicle speed increases, and a variable current to control torque output, all control schemes must include means to regulate these parameters.

Propulsion power must be supplied when the haulers operate on level or upwardly sloping surfaces. When operated on downwardly sloping surfaces, no propulsion power is needed; instead, means must be provided for retarding the forward progress of the haulers. Friction brakes are not suitable for this purpose, since they tend to wear out quickly due to the very large mass of these vehicles, especially when loaded. While friction or similar braking systems are included on the haulers as the primary stopping means, most such haulers utilize the DC electric wheel motors to provide the continuous retarding torque required when traveling on a downward slope. This is accomplished either by reversing the wheel motor field current or armature current, causing the DC motors to reverse torque direction and act as DC generators, powered through the gear reduction units by the hauler drive wheels. Resistance sources, called "retard resistors," are used to create a load, so that current generated by the DC motors is consumed by the resistors and dissipated as heat into the atmosphere. The amount of current consumed creates a corresponding load on the DC wheel motors, which is transmitted through the gear reduction units to the drive wheels as retarding torque.

Even when operated in the retarding mode, it is necessary on prior art haulers for the prime mover diesel engines to continue to generate sufficient power to meet auxiliary and parasitic power requirements on the hauler for such items as driving fans, powering hydraulic systems, generating field current for the wheel motors, powering the air conditioning or heating, etc. Also, even an unloaded engine uses fuel to overcome losses due to compression, friction, and the like. Such auxiliary and parasitic loads and engine losses result in substantial consumption of fuel by the engine even when the hauler is operating in a retarding mode in which it is generating, and dissipating to the atmosphere, substantial quantities of power.

In some prior art haulers, such as the Marathon LeTourneau Model T-2000 TITAN truck, means are provided for regenerating at least a portion of the DC power generated by the DC electric wheel motors when operating in a retarding mode into the AC power system, so as to relieve all or part of the AC power load on the AC generator and to drive the AC generator as an AC synchronous motor to provide power to the engine to relieve all or part of the mechanical engine loads. However, such systems heretofore have not been capable of supplying the first power generated by the DC electric drive motors into the AC system or consistently to supply power into the AC system throughout the retard cycle because of the operational characteristics of the retard resistors and motor voltage and current limits. Therefore, even with the best existing designs, it often is necessary to consume fuel to power engine parasitic and auxiliary loads even while the overall system is dissipating large amounts of power as heat from the retarding resistors.

Because of the high cost of fossil fuels, and because of engine horse power limitations, it also sometimes is desirable to operate off-road haulers and similar vehicles on trolley systems whereby an external source of electric power, such as a trolley line, is used to power the electric DC wheel motors. Since the trolly line power source is a fixed voltage source, control means must be implemented to regulate the voltage and current required by the DC electric wheel motors. Trolley power often is available for only a portion of the area in which the haulers operate (for example, trolley power may be available on roads into or out off the mining area, but not within the floor or other parts of the open pit mine itself). Therefore, it is necessary to continue to provide on-board diesel electric power for the haulers. The haulers thus may be propelled by on-board generated power in areas where trolley line power is not available, and switch to trolley line power for other portions of their load cycle. This requires means for accommodating both on-board generated electric power and fixed voltage external DC power from the line trolley. This type of operation typically is referred to as "trolley-assist" since the trolley line power is available only in certain locations to assist the hauler operation.

On existing haulers using trolley-assist, mechanical switching systems are provided so that the hauler's DC wheel motors are decoupled from the vehicle's on-board diesel electric system and are coupled to, and controlled by, an alternate power control means which regulates the voltage and current from the trolley line power to the DC wheel motors. Where trolley line power is not available, the DC wheel motors are recoupled to the on-board diesel electric system. This creates an "either/or" operating choice and imposes stringent limitations on operating procedures. The mechanical switching gear and the alternate voltage and current controls required for trolley operation also add to capital costs and maintenance costs. Moreover, with existing trolley-assist systems, even when the hauler is operating on trolley line power, the on-board engine must be kept running to provide power for auxiliary functions of the vehicle.

It is, accordingly, a primary object of the present invention to provide a propelling and retarding system for off-road haulers in which the initial power generated in the retarding mode can be regenerated into the AC electric system, to replace loads otherwise carried by the internal combustion engine.

Another object is to provide such a system in which essentially all power requirements for the internal combustion engine and AC power system are met before any power generated in the retard mode is dissipated through the retarding resistors.

A further object is to provide such a system in which auxiliary line power at fixed voltage may be fed into the system for powering the DC electric wheel motors without first decoupling the motors from the on-board diesel electric system.

A further object is to provide such a system which can utilize auxiliary line power over a wide fixed voltage range, from at least approximately 1,000 to at least approximately 2,000 volts.

A still further object is to provide such a system in which trolley line power may be utilized to power the hauler's DC wheel motors in the propel mode, to meet all other electrical power requirements for the hauler and to supply power to the internal combustion engine to relieve all auxiliary and parasitic loads on the engine, so as to eliminate essentially all fuel requirements for the engine during the periods when trolley line power is available.

BRIEF DESCRIPTION OF THE DRAWINGS

These and other objects and advantages of the present invention will be apparent from the following detailed disclosure and description of the invention and from the following drawings wherein like numerals indicate like parts and wherein.

DETAILED DESCRIPTION

Figure 1:
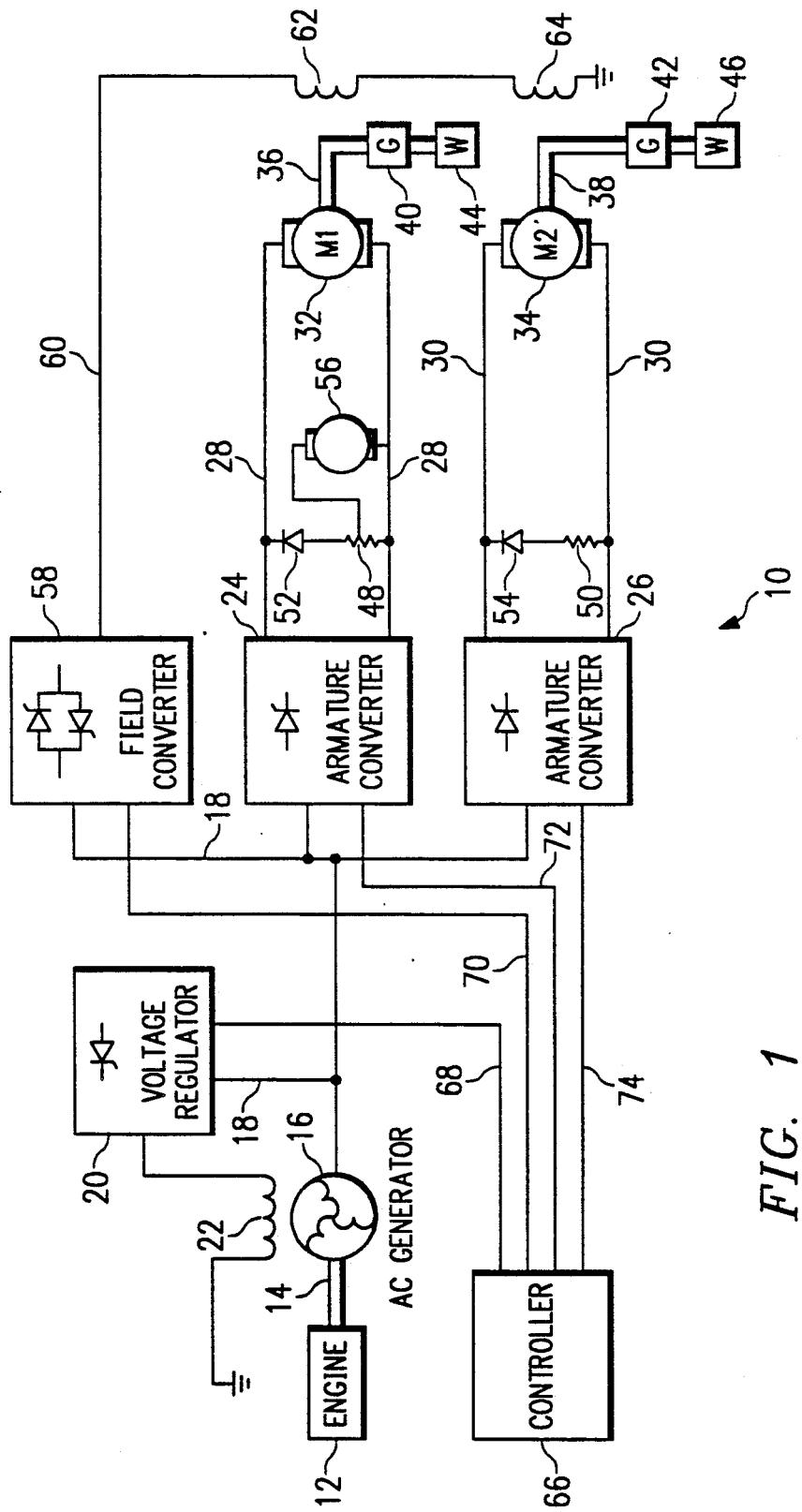
FIG. 1 is a schematic illustration of a prior art system for powering and retarding an off-road hauler.

Referring now to FIG. 1, there is shown in schematic illustration a prior art system 10 for powering and retarding an off-road hauler such as the Marathon Le-Tourneau TITAN truck Model T-2000. In this system, a hydrocarbon fuel (preferably diesel) powered engine 12 is a prime mover and is coupled through coupling 14 to a generator 16. The generator preferably is an AC three-phase generator of power capacity matched to the engine 12 in the requirements of the system. The generator 16 is adapted, when driven by the engine 12 to supply AC current at a desired voltage (preferably approximately 1,000 volts) into an AC powered distribution means such as an AC grid system represented by the bold connected lines 18. The system illustrated in FIG. 1 is contained entirely on-board the hauler and is adapted to operate in two modes: a propel mode in which it provides propelling torque to the drive wheels of the hauler, to propel the hauler at the desired speed, and in a retarding mode in which it provides retarding torque to the drive wheels of the hauler, so as to slow the forward motion of the hauler on a downwardly sloping surface.

The generator 16 is also adapted, when the system 10 is operated in a retarding mode, to receive AC power from the AC power distribution grid 18 and to be driven as a synchronous AC motor, providing rotational power through the coupling 14 back to the engine 12.

Although not illustrated in the drawing, the engine 12 in addition to supplying power to drive the generator 16, also must supply power for various auxiliary items driven directly from the engine or powered from the AC power grid, such as fan loads, water and fuel pumps, hydraulic system pumps and the like. The engine 12 also must supply power to overcome internal loading created by friction, fuel compression and the like.

Electrically connected to the AC power distribution grid 18 is a voltage regulator 20 which maintains control of the AC voltage in the AC power distribution grid by regulating the flow of current to the generator field in the rotor section of the AC generator 16, represented in FIG. 1 schematically by the coil 22. The voltage regulator preferably is a three-phase half wave controlled converter unit of conventional design.

Also electrically connected to the AC power distribution grid are two thyristor-type armature converters 24 and 26 which convert AC power into DC power for supply through DC current lines 28 and 30 to a pair of DC electric wheel motors 32 and 34. The motors 32 and 34 in turn supply motive torque through drive shafts 36, 38 and gear reduction units 40, 42 to the hauler drive wheels 44, 46 to propel the hauler. Typically, one wheel motor will power drive wheels on one side of the hauler and the other wheel motor will power drive wheels on the other side of the hauler.

The wheel motor armature thyristor converters 24, 26 preferably are three-phase, full control, full wave thyristor converter units of conventional design for use in DC motor drive systems. In such thyristor converters, AC voltage is rectified and controlled by proper timing of the gating pulses to an array of thyristors. They have the ability to deliver power from an AC source to a DC load in an infinitely variable manner from zero to maximum DC volts, and if the DC load becomes a source, as it does when the system 10 is operated in a retarding mode, the thyristor converters 24, 26 also have the ability to regenerate power back from the DC to AC lines. Most preferably, the thyristor armature converters 24, 26 are three-phase, full-wave control rectifier-type, or "six-pulse bridge converters," using six thyristors attached to the three AC phases in a bridge configuration. This is a type of a two quadrant converter which delivers power in one direction and can receive power back in the opposite direction. Such converter's function in receiving power from the DC side and delivering power into the AC power grid system is referred to herein as "regenerating" or "regeneration."

Also electrically connected to the AC power distribution grid 18 is a motor field converter 58 which converts AC power into DC power for delivery through DC electrical lines 60 to the motor field windings for the DC wheel motors 32, 34. Such motor field windings are represented schematically in FIG. 1 by electric coils 62, 64. A DC motor must have both field current and armature current to produce torque.

The motor field converter 58 also is a thyristor converter of a type well known to those skilled in the art. Preferably, it is a dual three-phase half-wave controlled rectifier, or dual three-pulse mid-point converter. It uses three thyristors attached to the three AC phases to provide load current returned to the neutral in one direction, and three thyristors attached in the opposite direction to the three AC phases to provide load current returned in the opposite direction. Since each three-phase segment can deliver power in one direction, and can receive power back in the opposite direction (regeneration) this also is called a four quadrant converter. The reversal of current through the motor fields reverses the direction of motor torque allowing the total motor system to operate in four quadrants (propel and retard in the forward direction and propel and retard in the reverse direction).

Also connected across the DC circuits represented by lines 28 and 30 are two sets of retarding resistors, 48, 50 and a pair of retard diodes 52, 54. The retarding resistors are a plurality of staged, high power DC electric resistors capable of dissipating large amounts of electrical energy as heat, when the system 10 is operated in the retarding mode. The resistors are provided with cooling fans (not shown) driven by DC electric motor 56. A single fan motor 56 may provide power for fans to cool both sets of retarding resistors 48, 50. The retard diodes 52, 54 serve to block power to the retarding resistors when the system is operated in the propel mode.

Control of the system 10 is provided by the controller 66 which suitably is connected by electrical lines 68, 70, 72 and 74 to the voltage regulator 20, field converter 58 and armature converters 24, 26. The controller may be of any suitable design. It receives vehicle operator inputs of speed command, direction selection, propel or retard commands, engine speed and generator power. The controller also receives system feedback signals representing motor voltage, armature current, motor field current, generator voltage, engine speed/AC frequency, and motor speed. Additional operator controls, feedback signals and other control features may be designed into the controller, as desired.

As the control and computation portion of the system, controller 66 provides the logic, control loops and gating pulses for regulating all the converter outputs. It consists of arrays and combinations of proportional, integral and derivative (PID) control circuits, with transform functions described by conventional control system and feedback theory. These can be implemented by operational amplifier type circuits (analogue), or transform equations computed by microprocessor circuitry (digital). The specialty nature of the system controlled, and close integration requirements, lends itself to custom circuit design rather than utilization of standard available computer and control systems. Preferably, the control system is based on closed control loops whereby the response to a commanded level is fed back to the controller 66 to become part of the control process. The outer or overall loop is the response of the control system to a vehicle speed commanded by the operator of the vehicle. Within this loop are sub-loops that control engine speed and generator voltage, and inner loops that control motor voltage and current parameters that produce motor torque and hence motor speed. The time constants and transform functions of the control loops are coordinated for proper timing and response. The main output of the controller 66 is the properly timed gating pulses for the various thyristor converters to produce the required armature, field and retard converter currents and voltages.

The system 10 as disclosed may be used either to propel or to retard the off-road hauler. When operated in the propel mode, the diesel engine 12 is used to drive the AC generator 16. After the generator 16 is primed, and AC voltage begins to rise, the voltage regulator 20 maintains control of the AC voltage by regulating flow of current to the generator field 22. The controller 66 senses generator voltage and frequency to maintain proper levels. As the vehicle operator commands vehicle speed and direction, the controller 66 provides gating pulses to the thyristors of the motor field converter 58 and motor armature converters 24 and 26. These converters then provide DC current to the DC wheel motors 32, 34 and motor field winding 62, 64. Controller 66 maintains the proper torque and speed of the motors 32, 34 by sensing the various feedback signals measuring the armature current, field currents, motor voltages and motor speeds and by suitably adjusting the thyristor gatings in the converters to maintain proper levels. When the retard mode is activated to slow or stop the hauler, the field converter 58 regenerates the existing field energy back into the AC power grid 18 and then provides field current in the opposite direction. This reverses the torque direction and the voltage polarities on the motors 32 and 34, which then operate as DC generators. Alternatively, the field current could remain unchanged, and the armature current reversed in each of wheel motors 32, 34, which also would cause them to operate as DC generators.

With a negative motor voltage, the retard diodes 52, 54 are forward biased and DC current generated by the motors 32, 34 flows through the retarding resistors 48, 50 where the electrical energy is converted into heat. Fans (not shown) are provided for blowing ambient air over the resistors, or over heat exchange fins or the like, associated with the resistors, for dissipating the heat generated. The fans are powered by blower motor 56, a series wound DC motor which is connected across a portion of the retarding resistors 48. As retard voltage increases, the speed of fan motor 56 also increases, so that more cooling air automatically is supplied across the retarding resistors 48, 50.

The armature converters 24, 26 can be gated so that a portion of the DC power generated by the wheel motors is regenerated back into the AC power distribution grid 18. The sum of the power delivered to the retarding resistors 48, 50 and the power regenerated into the AC grid by the armature converters 24, 26 is the total retarding load exerted on the hauler drive wheels 44, 46 by the motors 32, 34. AC power supplied to the AC power distribution grid 18 from the armature converters 24, 26 may be used to replace AC power consumed by the field converter 58 in establishing the motor field currents 62, 64, by the voltage regulator 20 in establishing the generator field 22, and by other AC power loads on the system. Additionally, the AC generator 16 may be controlled to operate, when sufficient AC power is available from the armature converters 24, 26, as a synchronous AC motor driving the engine 12 through coupling 14, so as to relieve the load imposed on the engine by auxiliary equipment and by parasitic loads, so as to reduce substantially fuel requirements for the engine. However, the engine must be kept idling at its operating speed even when operating in a "no load" condition so as to maintain proper generator voltage and frequency, and be available to supply power to the system as needed.

The level of retarding effort, and distribution of the power generated by the wheel motors 32, 34, is controlled by the controller 66. However, there are restrictions on the distribution of generated power during retard operation because the retarding resistors 48, 50 are a plurality of staged, fixed value resistors and the voltage and current produced by the motors 32, 34 are restricted by motor design limits. The retarding effort which must be generated mechanically as horsepower in the wheel motors 32, 34 is electrically a function of voltage times current and mechanically a function of torque times speed. Commutator design, motor windings, and other magnetic considerations limit the maximum voltage and the amount of current that can be commutated (transferred from the brush to the commutator) in the motors. An increase of motor speed also reduces the allowed current. Therefore, motor current and voltage limitations are considered when the values of the sets of staged resistors 48, 50 are selected. The resistance values selected are at least a compromise when the whole motor speed range is considered. At the maximum motor voltage, the resistors 48, 50 establish the armature current, and the motor design establishes an operating speed that can commutate this current. At this operating speed, all of the current generated by the wheel motors 32, 34 must flow through the selected resistors in order to obtain maximum retard effort. If maximum retard effort is not needed, motor voltage can be lowered, reducing current through resistors 48, 50, thus allowing some motor current to regenerate back to the AC distribution grid 18 through armature converters 24, 26. This means higher currents and less efficiency for the same retard effort than if voltage can be maintained at maximum and current reduced. At motor speeds less than the above mentioned operating speed, regeneration of power into the AC power grid will occur, but only after the selected retarding resistors have absorbed their maximum load at that voltage. Again, further regeneration can be accomplished at lower retarding efforts by further lowering motor voltage, but this means higher currents and less efficiency than when the motors are kept at maximum voltage. Also, when regeneration does occur, care must be taken not to regenerate more power than the AC grid can absorb. Conversely, if the wheel motors are operated at greater than the selected speed, the current must be reduced for good motor commutation. Voltage must be lowered in order to reduce the current, which means that the retarding effort is lowered by the square of the required current reduction rather than as a linear function, which would be the case if voltage could be maintained at a maximum and only current reduced.

As a result of these limitations, additional current is available for supply through the converters 24, 26 into the AC distribution grid only at certain levels of retard effort. At other times, additional fuel may be consumed in the engine 12 to power the engine for parasitic or auxiliary loads, and to drive the AC generator 16, even though the system is operating in the retard mode and substantial quantities of electrical current are being fed to the resistors 48, 50 and dissipated as heat. It would be more efficient if the first power generated by the motors 32, 34 when operating in a retard mode, could be fed directly back into the AC line through the converters to replace AC line loads and/or engine auxiliary and parasitic loads before any power is dissipated through the retarding resistors. However, this is not possible with any existing hauler power and control system because of the system operating limitations discussed above.

Figure 2:
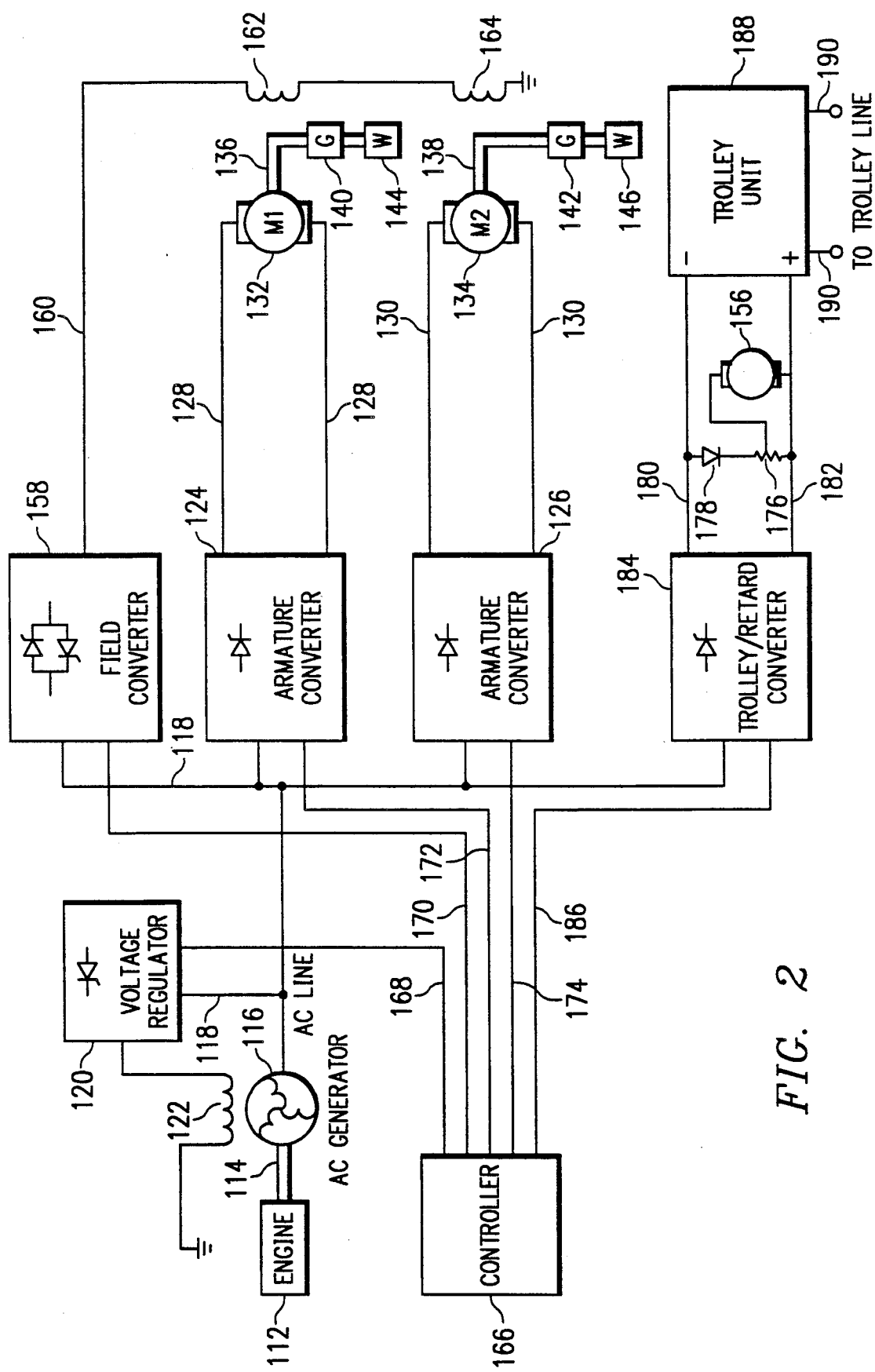
FIG. 2 is a schematic illustration of a system for powering and retarding an off-road hauler in accordance with the present invention.

Referring now to FIG. 2, there is shown an improved hauler propelling and retarding system 110 in accordance with the present invention which permits the initial power generated during the retard cycle to be regenerated into the AC grid to relieve all load on the diesel engine before any power is dumped to the resistors. In the improved system 110, most components are the same, or substantially the same, as corresponding parts and components illustrated and described in connection with the prior art system of FIG. 1 and are assigned corresponding numbers, preceded in each instance by a "1." Thus, the engine 112 in system 110 corresponds to the diesel engine 12 in the prior art system 10, AC generator 116 corresponds to AC generator 16, etc.

In the system 110, the retarding resistors 48, 50 have been removed from the DC circuits associated with the motors 32, 34, and have been replaced by retarding resistors 176, which are similar in function and equal in capacity to the combined resistors 48, 50 of FIG. 1. Resistors 176 are connected across a DC circuit represented by DC power lines 180, 182, which are electrically connected, in turn, to a retard converter 184. The retard converter 184 is suitably electrically connected to the AC power distribution grid 118 and, through control line 186, to the controller 166.

The retard converter 184 also is of thyristor type and preferably is a three-phase full-wave controlled rectifier, using six thyristors attached to the three AC phases in a bridged configuration, similar in design to the armature converters 124, 126, but having a suitably increased capacity.

In the propel mode, the system 110 operates in substantially the same manner as prior art system 10 (FIG. 1). AC power generated in AC generator 116, driven by engine 112, is supplied through the AC grid 118 to thyristor armature converters 124, 126, for conversion into DC power. Power is supplied to DC wheel motors 132, 134, and is transmitted through drive shafts 136, 138, and gear reduction units 140, 142 to the hauler drive wheels 144, 146. During the propel mode, the retard converter is not activated, so that no power is delivered to the retard resistors.

When the retarding mode is activated, the field converter 158 regenerates the existing field energy back into the AC grid and then provides field current in the opposite direction. This reverses the motor torque, and the DC wheel motors 132, 134 will operate as DC generators, powered by the hauler drive wheels 144, 146. Alternatively, rather than reversing the field current, the armature current in wheel motors 132, 134 could be reversed by using dual armature converters in place of armature converters 124, 126. The armature converters 124, 126 are gated so that power is regenerated into the AC line. The amount of retard energy generated is regulated by the controller 166 to maintain the commanded vehicle speed. Since the retarding resistors no longer are present across the DC motor circuits 128, 130, all power generated by the motors is regenerated through the thyristor type converters into the AC power distribution grid 118. The regenerated energy is used first to supply power for any other AC line loads, such as field converter 158 and voltage regulator 120. This unloads the AC generator 116 and reduces the consumption of fuel by the engine 112. As additional generated power is available from the wheel motors 132, 134, power is supplied to the AC generator 116, causing it to operate as a synchronous AC motor driving the engine 112. This fully unloads the engine 112, since power from the generator 116 is available to supply all auxiliary and parasitic power requirements for the engine 112, reducing fuel usage to essentially zero. At this point, any additional power generated by the wheel motors 132, 134 will be supplied through AC distribution grid 118 to the retard converter 184 for conversion into DC power and consumption in the retarding resistors 176. As with the FIG. 1 system, fan motor 156 supplies power to cooling fans (not shown) to dissipate the generated heat into the atmosphere.

Controller 166 senses the amount of regenerated retard energy supplied into the AC circuit, engine rpm and AC generator frequency and voltage, as well as other relevant drive motor parameters, so as to properly control overall operation of the system. The presence of the thyristor-type retard converter 184 connected to the AC power system allows an infinitely variable dump of excess retard energy to the retarding resistors 176. Since the armature conerters 124, 126 permit all retad energy generated by the motors 132, 134 to be regenerated into the AC line, the motors 132, 134 can be operated at maximum voltage limits and current limits throughout their entire speed range, providing maximum possible torque and horsepower for the retard function. This eliminates operating limitations imposed by prior art systems having staged, fixed capacity, retarding resistors connected across the drive motor DC circuits.

The system 110 also is adapted to receive and utilize DC electrical line power from a source external to the hauler, such as from conventional twin overhead DC trolley lines. As shown in phantom lines in FIG. 2, an optional trolley unit 188 may be added to the hauler and includes means, such as a panograph or trolley poles illustrated schematically at 190, which are selectively engagable with a DC trolley line. The trolley unit 188 also includes means for electrical connection into the DC side of retard converter 184 through DC lines 180, 182. Retard diode 178 is added in line with retarding resistors 176. The trolley unit is adapted for connection at a voltage polarity opposite to that normally exerted across the retarding resistors 176, so that power diode 178 automatically is reverse biased and isolates the retard resistors 176, preventing trolley line power from being fed into the resistors.

In locations where trolley line power is available, the line power connection means 190 may be actuated by the vehicle operator, or by suitable automatic means, to connect the system 110 to trolley line power. When the controller 166 senses that the trolley unit 188 is on line, the thyristors in retard converter 184 (now functioning as a combination trolley/retard converter) are gated so that power is regenerated into the AC power distribution grid 118. The regenerated power is used to supply all AC power requirements of the hauler in the propel mode, including the power requirements for drive motors 132, 134, field converter 158 and voltage regulator 120. Additional AC power from the retard converter 184 then is available to drive AC generator 116 as a synchronous motor to relieve all loads on the engine 112, reducing engine fuel usage to essentially zero. Controller 166 will continue to regulate the voltage regulator 120 to maintain desired system voltage.

In the system 110, power may be supplied into the AC power grid simultaneously from the trolley unit 188 through converter 184 and from the AC generator 116 driven by engine 112. Therefore, it is not necessary to disconnect or disable the diesel/electric on-board power generation system prior to connecting to external trolley line power. As trolley line power becomes available, it automatically will replace AC power from the AC generator to reduce and, ultimately, eliminate, the load on engine 112. Conversely, as the hauler leaves an area where trolley line power is available, the line power connection means 190 will disengage and power will cease to be supplied into the AC system from the trolley unit. The controller 166 will sense the loss of trolley unit power and automatically will supply additional fuel to engine 112 to generate necessary propelling power through the AC generator 116. All of this is accomplished without the use of complex electrical switching gear or a separate control system for regulating the voltage and current from the trolley line power to the DC drive motors 132, 134.

With the system of FIG. 2, the maximum trolley line voltage should not be substantially greater than the maximum voltage normally generated into the AC distribution system 118 by generator 116 for proper operation of the thyristors. In approximate numbers, the DC voltage exerted across each of the DC electric wheel motors 132, 134, by the armature converters 124, 126 is the same as the AC voltage. For DC electric wheel motors designed to operate at a maximum of approximately 1,000 volts, the system as shown in FIG. 2 would be suitable for use with trolley line power only up to approximately 1,000 volts. A number of trolley-assist installations exist in mines around the world which utilize 1,000 to 1,200 volt DC trolley line power provided as a supplemental power source to diesel electric haulers operating on uphill grades. For such installations, a power and retard system substantially as shown in FIG. 2, and utilizing 1,000 volts electric drive motors would be suitable and would provide substantial advantages over prior art systems.

Figure 3:
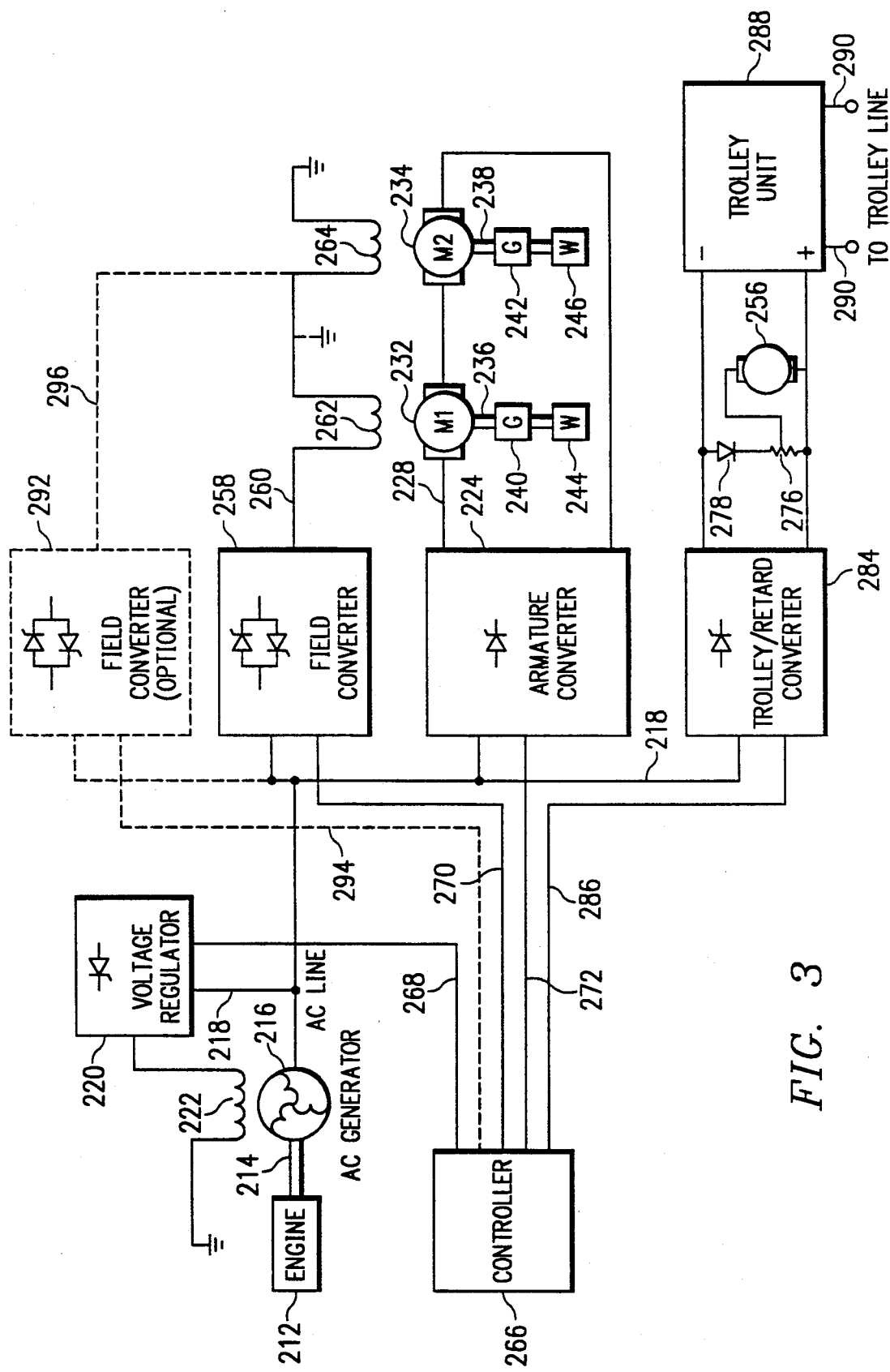
FIG. 3 is a schematic illustration of an alternate system for powering and retarding an off-road hauler in accordance with the present invention.

Other trolley-assist installations, however, generate trolley line voltage in the 2,000 to 2,200 volt range, and would not be suitable for use with haulers having 1,000 volt DC wheel motors connected in parallel as shown in FIG. 2. Therefore, in an alternate embodiment of the invention, a method and apparatus are provided for propelling and retarding off-road haulers which may utilize supplemental trolley line power over a wide DC voltage range of from about 1,000 to about 2,200 volts. This embodiment, illustrated in FIG. 3, comprises a system 210 having many of the same components as the 110 system illustrated in FIG. 2. Corresponding parts and function are indicated by a corresponding numbering system in which the first digit of each component number has been changed from a "1" to a "2." Thus, engine 212 in FIG. 3 is substantially the same as internal combustion engine 112 in FIG. 2, AC generator 216 is substantially the same as AC generator 116, etc.

In system 210, the AC generator 216 is adapted to generate approximately 2,000 volts of AC current which the thyristor-type armature converter 224 will convert into a similar voltage DC current for feed to the DC wheel motors 232, 234. However, since the drive motors 232, 234 are connected in series, each will see only about 1,000 volts maximum, permitting the use of conventional 1,000 volt hauler wheel motors.

With this configuration, the trolley unit 228 may utilize DC line current of up to approximately 2,000 to 2,200 volts. Since the trolley/retard converter 284 will regenerate any lower voltages of DC current supplied from the trolley unit into the AC power grid at a desired higher voltage (e.g., 2,000 volts), the system also may be used with existing 1,000 volt DC trolley line power without any change in the hauler propelling and retarding system.

With both the drive motors 232, 234 and motor fields 262, 264 in series, each of the motors 232, 234 will deliver substantially equal torque to the hauler drive wheels 244, 246. In some instances, such as slippery road conditions, it may be desirable for the drive wheels on one side of the hauler to deliver lesser torque than those on the other, in order to control wheel slippage. If desired, this object can be accomplished by incorporating into the system 210 an additional thyristor-type field converter 292 of the same design as field converter 258. Field converter 292 may be suitably electrically connected into the AC power distribution grid as shown, and connected to controller 266 as by control line 294. An additional DC current line 296 connects the second field converter 292 to the second field winding coil 264, with each of the field winding coils 262 and 264 being separately grounded as shown. Controller 266 then may be used to control independently the current fields for motors 232 and 234 so as to adjust, individually, the amount of propelling or retarding torque generated by each motor.

The operation and advantages of the propelling/retarding system 210 are substantially the same as described in connection with that for system 110 as shown in FIG. 2, except that the trolley unit 288 automatically can accept trolley line voltages of from about 1,000 to about 2,200 volts without the necessity for any rewiring, switching or other change in the system. The AC generator voltage automatically will be maintained at the desired level of 2,000 volts AC by the operation of the voltage regulator 220. Higher AC voltage generators also could be incorporated into the system, giving a proportionally higher trolley line voltage maximum range.

The foregoing disclosure and description is illustrative only, and various changes may be made in the configuration, operation and control of the system, without departing from the scope of the invention as set forth in the appended claims. For example, as will be apparent to those skilled in the art, a thyristor type converter could be used to supply power into the AC distribution power grid from an external DC line power source regardless of whether the external line power is supplied through the retard converters as illustrated in FIGS. 2 or 3, or whether the line power is supplied through a separate trolley converter dedicated to the trolley unit. Thus, prior art systems such as shown in FIG. 1 could be modified, or existing haulers retro-fitted, for trolley assist usage by addition of trolley power connection means connected into the AC power grids through thyristor-type converters. The operational advantages of supplying trolley line power into the AC distribution grid through a thyristor type converter will be obtained regardless of whether the retarding resistors are connected to the AC power grid, as shown in FIGS. 2 and 3, or to the DC motor lines, as illustrated in FIG. 1. Further, if the FIG. 1 prior art system was modified to receive trolley line power through a thyristor-type converter at 2,000 volts, it will be apparent from the foregoing disclosure and description of the present invention that the wheel motors 32, 34 in the prior art system could be placed in series and other components modified so as to accommodate approximately 2,000 volts of AC power in the AC power grid 18. All such modifications and variations on the propelling and retarding systems disclosed, as well as others which will be apparent to those skilled in the art, are considered to be within the scope of the present invention.

What is claimed is:

1. A system for propelling an off-road hauler, said system comprising:
    an internal combustion engine;
    AC generator means adapted to be driven by said engine to generate AC electric power;
    AC power distribution means electrically connected to said AC generator means and comprising means for distributing AC electric power generated by said generator means;
    voltage regulator means electrically connected to said AC power distribution means and comprising means for regulating the voltage of said AC electric power;
    DC wheel motor means on said hauler and adapted to deliver propelling power to a drive wheel of said hauler;
    armature thyristor converter means electrically connected to said AC power distribution means and said DC wheel motor means and adapted to receive AC electric power from said AC power distribution means and to deliver DC electric power to said DC wheel motor means;
    field current generating means associated with said DC wheel motor means and comprising means for generating a DC current field for said DC wheel motor means;
    field current thyristor converter means electrically connected to said AC power distribution means and said field current generating means and comprising means for receiving AC power from said AC power distribution means and supplying DC power to said field current generating means;
    line power connection means on said hauler for selectively connecting said system to DC line power from a source external to said hauler;
    line power thyristor converter means electrically connected to said line power connection means and said AC power distribution means and comprising means for receiving DC electrical power from said line power connection means and supplying AC electrical power to said AC power distribution means; and
    control means electrically connected to said voltage regulator means, armature thyristor converter means, field current thyristor converter means and line power thyristor converter means and comprising means for controlling the operation of said voltage regulator means, armature thyristor converter means, field current thyristor converter means and line power thyristor converter means;
    whereby said off-road hauler may be propelled by one of (1) power generated on-board by said AC generator means, (2) DC line power from said source external to said hauler and (3) by power supplied simultaneously by both said AC generator means and said DC line power from said source external to said hauler, without the necessity for electrical switching apparatus for switching between said power generated on-board and said DC line power.

2. The system according to claim 1 wherein said AC generator means is adapted, when said system is supplied with electrical power from said source external to said hauler, to act as an AC electric motor to deliver power to said engine, whereby said DC line power from said source external to said hauler may be utilized to substantially eliminate loading on said engine so as to substantially reduce fuel consumption by said engine.

3. The system according to claim 1 wherein said armature thyristor converter means comprises a single armature thyristor converter connected to said AC power distribution means and wherein said DC wheel motor means comprise a pair of DC wheel motors connected in series to the DC side of said armature thyristor converter.

4. The system according to claim 3 wherein said field current thyristor converter means comprise a pair of field current thyristors connected to said AC power distribution means and wherein said field current generating means comprise a pair of field current coils, each of said field current coils being electrically connected to one of said field current thyristors and associated with one of said pair of DC wheel motors connected in series, whereby each of said field current thyristor converters may be controlled independently by said control means to thereby control independently the field current in each of said field current coils and the amount of torque generated by each of said pair of DC wheel motors.

5. In a system for propelling an off-road hauler of the type in which an internal combustion engine drives an AC generator to produce AC current, an AC grid electrically connected to said AC generator distributes said AC current, a first thyristor-type converter electrically connected to said AC grid and a DC electrical wheel motor receives AC power from the AC power distribution grid and delivers DC power to said DC electric wheel motor which, in turn, delivers motive power to a drive wheel for said hauler, the improvement comprising:

line power connection means on said hauler for selective electric connection to DC line power from a source external to said hauler; and a second thyristor-type converter electrically connected to said line power connection means and said AC grid, said second thyristor-type converter comprising means for receiving DC power from said line power connection means and delivering AC power to said AC grid;

whereby electrical power from said source external to said hauler may be used to replace AC power supplied by said AC generator, to thereby reduce fuel consumption by said internal combustion engine, without electrically disconnecting said AC generator from said AC grid and without using electrical switching apparatus for switching between AC power supplied by said AC generator and DC power supplied from said line power source external to said hauler.

6. The system according to claim 5 wherein said line power connection means comprise means for electrically connecting said hauler to an overhead DC trolley line.

7. A system selectively operable in propel and retarding modes for, selectively, propelling and retarding an off-road hauler, said system comprising:

an internal combustion engine;

AC generator means mechanically connected to said engine and adapted, when said system is operated in said propel mode, to be powered by said engine to generate AC electric power and adapted, when said system is operated in said retarding mode, to act as an AC electric motor and to deliver power to said engine;

AC power distribution means electrically connected to said AC generator means and adapted, when said system is operated in said propel mode, to distribute AC electric power generated by said generator means and adapted, when said system is operated in said retarding mode, to deliver AC electric power to said generator means;

voltage regulator means electrically connected to said AC power distribution means, said voltage regulator means comprising means for regulating the voltage of said AC electric power;

DC wheel motor means on said hauler and adapted, when said system is operated in said propel mode, to deliver propelling torque to a drive wheel of said hauler and adapted, when said system is operated in said retarding mode, to act as a DC generator, receiving motive power from said drive wheel of said hauler and generating DC electric power to thereby exert retarding torque on said drive wheel;

armature thyristor converter means electrically connected to said AC power distribution means and said DC wheel motor means and adapted, when said system is operated in said propel mode, to receive AC electric power from said AC power distribution means and to deliver DC electric power to said DC wheel motor means and adapted, when said system is operated in said retarding mode, to receive DC power generated by said DC wheel motor means and to deliver AC electric power to said AC power distribution means;

field current generating means associated with said DC wheel motor means, said field current generating means comprising means for generating a DC current field for said DC wheel motor means;

field current thyristor converter means electrically connected to said AC power distribution means and said field current generating means, said field current thyristor converter means comprising means for receiving AC power from said AC power distribution means and supplying DC power to said field current generating means;

means associated with said DC wheel motor means for selectively causing said DC wheel motor means to act as a motor when said system is operated in said propel mode and to act as a DC generator when said system is operated in said retarding mode;

retarding resistor means adapted, when said system is operated in said retarding mode, to consume electric power generated by said DC electric wheel motor means;

retarding resistor thyristor converter means electrically connected to said AC power distribution means and said retarding resistor means, said retarding resistor thyristor converter means comprising means for receiving AC electric power from said AC power distribution means and supplying DC electric power to said retarding resistor means; and control means electrically connected to said voltage regulator means, armature thyristor converter means, field current thyristor converter means and retarding resistor thyristor converter means, said control means comprising means for controlling the operation of said voltage regulator means, armature thyristor converter means, field current thyristor converter means and retarding resistor thyristor converter means to thereby contrdl the direction and amount of propelling and retarding torque exerted by said DC wheel motor means;

whereby, when said system is operated in said retarding mode, electric power generated by said DC wheel motor means may be used first to reduce the power requirements for said internal combustion engine, with excess electric power generated by said DC electric wheel motor means being supplied to said retarding resistor means.

8. The system according to claim 7 comprising additionally line power connection means for selectively connecting said system to DC line power from a source external to said hauler and for supplying said external DC line power to the DC side of said retarding resistor thyristor converter means, whereby DC line power from said external source may be converted to AC electric power by said retarding resistor thyristor converter means and supplied to said AC power distribution means to replace AC power generated by said AC generator and to reduce the power requirements for said internal combustion engine.

9. The system according to claim 8 wherein said line power connection means is connected into said system at a DC voltage opposite in polarity to that normally existing across said retarding resistor means and comprising additionally a power diode connected in said system between said line power connection means and said retarding resistor means, whereby when said external DC line power is connected to said system through said line power connection means, said opposite polarity of said DC line power will reverse bias said power diode and block said DC line power from feeding into said retarding resistor means, while permitting said DC line power to feed into said retarding resistor thyristor converter means for conversion to AC power.

10. The system according to claim 7 wherein said means for selectively causing said DC wheel motor means to act as a motor when said system is operated in said propel mode and to act as a DC generator when said system is operated in said retarding mode comprises means for selectively reversing said DC current field.

11. The system according to claim 7, 8, 9 or 10 wherein said armature thyristor converter means comprises a single armature thyristor converter connected to said AC power distribution and wherein said DC wheel motor means comprises a pair of DC wheel motors connected in series to the DC side of said armature thyristor converter.

12. The system according to claim 11 wherein said field current thyristor converter means comprises a signal field current thyristor converter and wherein said field current generating means comprise a pair of field current coils connected in series to the DC side of said field current thyristor converter and in association with said pair of DC electric wheel motors, whereby said DC electric wheel motors will opersate to deliver substantially equal amounts of propelling torque when said system is oiperated in said propel mode and will generate substantially equal amounts of retarding torque when said system is operated in said retard mode.

13. The system according to claim 11 wherein said field current thyristor converter means comprise a pair of field current thyristor converters connected to said AC power distribution means and wherein said field current generating means comprise a pair of field current coils, each of said field current coils being electrically connected to one of said field current thyristor and associated with one of said pair of DC wheel motors connected in series, whereby each of said field current thyristor converters may be controlled independently by said control means to thereby control the amount of current in each of said field current coils so as to control independently the amount of torque generated by each of said pair of DC wheel motors.

14. The system according to claim 7, 8, 9, or 10 where in said armature thyristor converter means comprise a plurality of armature thyristor converters in parallel to said AC power distribution means and wherein said DC wheel motor means comprise a plurality of DC wheel motors, each of said DC wheel motors being electrically connected to one of said armature thyristor converters.

15. The system according to claim 7 wherein said retarding resistor means comprise a plurality of staged resistors adapted to convert excess electrical power generated in said system into heat and comprising additionally means for dissipating the heat produced by said resistors.

16. A system for selectively propelling and retarding an off-road hauler, said system comprising:
an internal combustion engine;
an AC generator mechanically connected to said engine;
an AC power distribution grid electrically connected to said AC generator;
a voltage regulator electrically connected to said AC power distribution grid for regulating the voltage of AC electric power in said AC power distribution grid;
an armature converter electrically connected to said AC power distribution grid;
a DC electric wheel motor electrically connected to said armature thyristor converter;
a drive wheel for said off-road hauler mechanically connected to said DC electric wheel motor;
an electrical coil associated with said DC electric wheel motor for generating a DC current field for said DC electric wheel motor;
a field current thyristor converter electrically connected to said coil and to said AC power distribution grid;
a plurality of retarding resistors for dissipating excess electrical power generated in said system;
a retarding resistor thyristor converter electrically connected to said plurality of retarding resistors and electrically connected to said AC power distribution grid; and
a controller for controlling the operation of said voltage regulator, armature thyristor converter, field current thyristor converter and retarding resistor converters;
whereby said system may be operated in a propel mode in which said internal combustion engine drives said AC generator to produce AC power for supply to said AC power distribution grid, said armature thyristor converter converts AC power to DC power for said DC electric wheel motor, and said DC wheel motor exerts a desired propelling torque on said drive wheel; and whereby said system also may be operated in a retarding mode in which the direction of current in one of said DC current field and said DC electric wheel motor is reversed in polarity, said drive wheel of said hauler powers said DC electric wheel motor, causing said DC electric wheel motor to geherate DC electrical power which is converted by said armature thyristor converter to AC electrical power and supplied to said AC power distribution grid, said AC generator is powered by AC power from said AC power distribution grid, causing said AC generator to operate as an AC motor, driving said internal combustion engine, so as to reduce the fuel requirements for said engine and excess AC electrical power generated by said DC electric wheel motor is converted to DC electrical power by said retarding thyristor converter and is consumed by said retarding resistors and dissipated as heat.

17. The system according to claim 16 comprising additionally;
line power connection means selectively engageable with a source of DC line power external to said hauler and electrically connected to the DC side of said retarding resistor thyristor converter, whereby electrical power from said external source selectively may be supplied to said AC power distribution grid of said system without electrically disconnecting said AC generator from said AC power distribution grid and without using electrical switching apparatus for switching between AC power supplied by said AC generator and DC power supplied from said external source.

18. The apparatus according to claim 16 comprising additionally a power diode electrically connected in said system between said line power connection means and said retarding resistors and wherein said line power connection means is adapted to supply said DC line power from said external source to said system in a polarity opposite to that normally supplied to said retarding resistors, whereby said power diode automatically will prevent said DC line power from being supplied to said retarding resistors.

19. The system according to claim 16, 17 or 18 wherein two DC electrical wheel motors and two armature thyristor converters are provided, each wheel motor being connected to a drive wheel of said hauler and to an armature thyristor converter, with said armature thyristor converters being connected in parallel to said AC power distribution system, whereby each of said DC electric wheel motors may operate at a maximum voltage approximately equal to the maximum voltage supplied by said AC generator.

20. The system according to claim 16, 17 or 18 wherein a pair of DC electric wheel motors are provided, each said DC electric wheel motor being connected to a drive wheel of said hauler and wherein said pair of DC electric wheel motors are electrically connected in series to a single armature thyristor converter, whereby each of said DC electric wheel motors may operate at a maximum voltage equal to approximately one-half of the maximum voltage supplied by said AC generator.

21. The system according to claim 20 wherein said field current thyristor converter comprises a single field current thyristor converter and wherein said electrical coil comprises a pair of field current coils connected in series to the DC side of said field current thyristor converter and in association with said pair of DC electric wheel motors, whereby said DC electric wheel motors will operate to deliver substantially equal amounts of propelling torque when said system is operated in said propel mode and will generate substantially equal amounts of retarding torque when said system is operated in said retard mode.

22. The system according to claim 20 wherein said field current thyristor converter comprises a pair of field current thyristor converters connected in parallel to said AC power distribution grid and wherein said electrical coil for generating a DC current field comprises a pair of such electrical coils, each of said pair of electrical coils being electrically connected to one of said field current thyristor converters and associated with one said pair of DC wheel motors connected in series, whereby each of said field current thyristor converters may be controlled independently by said contol means to thereby control the amount of current in each of said electrical coils to control independently the amount of torque generated by each of said pair of DC wheel motors.

23. An electrical propulsion and distribution system for a vehicle, comprising:
an AC grid;
an AC generator coupled to said AC grid, and adapted to be coupled to an internal combustion engine;
a trolley converer, having DC terminals, having a control input, and having AC terminals coupled to said AC grid, for inverting DC power applied to said DC terminals and applying the inverted DC power to said AC grid responsive to control signals received at the control input of said trolley converter;
a DC motor, having a field coil and an armature;
a field converter for applying power from said AC grid to the field coil of a DC motor responsive to signals received at a control input;
an armature converter for applying power from said AC grid to the armature of a DC motor responsive to signals received at a control input; and
a controller, having outputs coupled to the control input of said trolley converter, to the control input of said field converter, and to the control input of said armature converter, said controller also having an input for sensing DC power applied to said DC terminals of said trolley converter, said controller for controlling said field converter and said armature converter to apply power from said AC grid to said field coil and armature, respectively, and for gating said trolley converter in such a manner to apply the inverted DC power to said AC grid simultaneously with said AC generator applying AC power to said AC grid.

24. The system of claim 23, wherein said controller has inputs for receiving speed command, armature power, and field coil power parameters, so that said controller is also for controlling said trolley converter in such a manner that, responsive to said field coil and armature converters applying sufficient power from said AC grid, said AC grid powers said AC generator as a synchronous motor.

25. The system of claim 23, wherein said trolley converter comprises a three-phase full-wave controlled thyristor rectifier.

26. An electrical propulsion and distribution system for a vehicle, comprising:
an AC grid;
an AC generator coupled to said AC grid, and adapted to be coupled to an internal combustion engine;
a trolley converter, having DC terminals, having a control input, and having AC terminals coupled to said AC grid, for inverting DC power applied to said DC terminals and applying the inverted DC power to said AC grid responsive to control signals received at the control input of said trolley converter;

a DC motor, having a field coil and an armature;

a field converter for applying power from said AC grid to the field coil of a DC motor responsive to signals received at a control input;

an armature converter for applying power from said AC grid to the armature of a DC motor responsive to signals received at a control input;

a retard load connected across said DC terminals; and a controller, having output coupled to the control input of said trolley converter, to the control input of said field converter, and to the control input of said armature converter, said controller also having an input for sensing DC power applied to said DC terminals of said trolley converter, said controller for controlling said field converter and said armature converter to apply power from said AC grid to said field coil and armature, respectively, and for gating said trolley converter in such a manner to apply the inverted DC power to said AC grid;

wherein said controller, in a retard mode, is also for controlling said field coil converter to apply reversed current to the field coil so that said armature converter applies power to said AC grid in such a manner that said AC grid powers said AC generator as a synchronous motor, and for controlling said trolley converter in such a manner that said retard load receives power from said AC grid.

27. The system of claim 26, wherein said retard load comprises a resistor and a diode connected in series between said DC terminals in such a manner that said diode is reverse biased when DC power is applied to said DC terminals.

28. An electrical propulsion and distribution system for a vehicle, comprising:

an AC grid;

an AC generator coupled to said AC grid, and adapted to be coupled to an internal combustion engine;

a trolley converter, having DC terminals, having a control input, and having AC terminals coupled to said AC grid, for inverting DC power applied to said DC terminals and applying the inverted DC power to said AC grid responsive to control signals received at the control input of said trolley converter;

a DC motor, having a field coil and an armature;

a field converter for applying power from said AC grid to the field coil of a DC motor responsive to signals received at a control input;

an armature converter for applying power from said AC grid to the armature of a DC motor responsive to signals received at a control input;

a retard load connected across said DC terminals; and a controller, having outputs coupled to the control input of said trolley converter, to the control input of said field converter, and to the control input of said armature converter, said controller also having an input for sensing DC power applied to said DC terminals of said trolley converter, said controller for controlling said field converter and said armature converter to apply power from said AC grid to said field coil and armature, respectively, and for gating said trolley converter in such a manner to apply the inverted DC power to said AC grid;

wherein said controller, in a retard mode, is also for controlling said armature converter to apply reversed current to the armature and to apply power to said AC grid in such a manner that said AC grid powers said AC generator as a synchronous motor, and for controlling said trolley converter in such a manner that said retard load receives power from said AC grid.

29. The system of claim 28, wherein said retard load comprises a resistor and a diode connected in series between said DC terminals in such a manner that said diode is reverse biased when DC power is applied to said DC terminals.

* * * * *